United States Patent [19]

St. Louis et al.

[11] Patent Number: 4,844,513

[45] Date of Patent: Jul. 4, 1989

[54] REMOTELY OPERABLE QUICK CONNECTOR FOR A COUPLING DEVICE

[75] Inventors: Paul T. St. Louis, Littleton; Charles L. Welch, Westminster, both of Colo.

[73] Assignee: Consolidated Technologies, Inc., Denver, Colo.

[21] Appl. No.: 938,423

[22] Filed: Dec. 5, 1986

[51] Int. Cl.⁴ .............................................. B60D 1/08
[52] U.S. Cl. ......................................... 285/39; 285/4; 285/85; 285/86; 285/307; 285/308; 285/316; 138/89
[58] Field of Search ................... 285/3, 4, 18, 39, 84, 285/85, 86, 305, 306, 307, 308, 316; 137/614.02, 614.03, 614.04, 614.05; 138/89, 89.4; 277/DIG. 2, DIG. 10

[56] References Cited

U.S. PATENT DOCUMENTS

| | | | |
|---|---|---|---|
| 2,679,408 | 5/1954 | Jacobi et al. | 285/85 |
| 2,887,124 | 5/1959 | Mehl et al. | 137/614 |
| 2,898,963 | 8/1959 | Courtot | 285/85 |
| 3,023,030 | 2/1962 | Torres | 285/18 |
| 3,052,488 | 9/1962 | Bruning | 285/18 |
| 3,170,748 | 2/1965 | Van Horssen | 285/85 |
| 3,222,088 | 12/1965 | Haeber | 285/18 |
| 3,497,862 | 2/1970 | Geffner | 285/85 |
| 3,613,726 | 10/1971 | Torres | 285/86 |
| 3,656,781 | 4/1972 | Paine et al. | 285/3 |
| 3,695,633 | 10/1972 | Hanes | 285/18 |
| 3,800,486 | 4/1974 | Harvey | 138/96 R |
| 3,847,413 | 11/1974 | Gurley et al. | 285/316 |
| 3,986,729 | 10/1976 | Taylor | 285/18 |
| 4,077,433 | 3/1978 | Maldavs | 137/614.04 |
| 4,139,005 | 2/1979 | Dickey | 138/96 R |
| 4,329,857 | 5/1982 | Kittle et al. | 138/89 |
| 4,432,569 | 2/1984 | Wietecha | 285/18 |
| 4,436,325 | 3/1984 | Miller | 285/18 |
| 4,483,371 | 11/1984 | Susin | 138/89 |
| 4,541,457 | 9/1985 | Blenkush | 137/614.05 |

Primary Examiner—Randolph A. Reese
Assistant Examiner—Anthony Knight
Attorney, Agent, or Firm—Gunn, Lee & Jackson

[57] ABSTRACT

This invention relates to a peripheral connector for a standard coupler, which permits the coupler to be remotely connectable and disconnectable. A male unit and a female unit of the invention enclose a male half and a female half of the coupler, respectively, and cover them with protective boots. A female unit projects an assembly, thereby opening the boot covering the female coupler half. The projected assembly pushes against portions of the male unit, opening the boot covering the male unit, and connecting the coupler. Disconnection is accomplished by moving the projected assembly in the opposite direction.

11 Claims, 4 Drawing Sheets

REMOTELY OPERABLE QUICK CONNECTOR FOR A COUPLING DEVICE

BACKGROUND OF THE INVENTION

1. Field of the Invention

This invention relates to connectors for umbiliclal leads, such as fluid or electrical lines, and in particular, devices for enabling remote coupling and uncoupling of such lines in machinery and lines in attachments for such machines.

2. Description of the Prior Art

For years, coupling devices have been used to connect and disconnect fluid pressure hoses. Such devices have been made for use with heavy machinery to permit hookups between a machine such as a tractor or backhoe and a special attachment tool.

Many of these coupling devices are connected and disconnected manually by an operator within physical reach of the coupler itself. For example, U.S. Pat. No. 3,052,488 (Bruning) discloses a fluid coupling having valves that open automatically when the coupling parts are engaged and that close automatically when the coupling parts are disengaged. The coupling device consists of a male and a female half, which are locked together after engagement and which may be quickly unlocked for detachment.

Other quick disconnect coupling devices are disclosed in U.S. Pat. Nos. 3,023,030 (Torres), U.S. Pat. No. 3,656,781 (Paine), U.S. Pat No. 3,847,413 (Gurley), U.S. Pat. and No. 4,077,433 (Maldavs). U.S. Pat. No. 3,656,781 discloses a coupling that may also be used for electrical cables.

At least one prior invention has also dealt with means for remotely disconnecting the coupling device. U.S. Pat. No. 2,887,124 discloses a remotely disconnectable coupling in which a nipple is coupled to a connector body by means of a pressure on a lip inside the connector body. Fluid pressure against a floating sleeve causes the pressure on the lip to be elimnated and the nipple falls away by gravity from the connector. U.S. Pat. No. 3,023,030 discloses another remotely disconnectable coupling in which fluid pressure acts directly on a locking sleeve of the coupler. In these other remotely operable coupling devices, the coupler and the means for remotely operating the coupler are a single mechanism. In contrast, the present invention is a peripheral device to be used with a separate standard coupler.

SUMMARY OF THE INVENTION

One object of the invention is to permit an operator of fluid machinery to connect and disconnect coupling devices for fluid pressure hoses, without being in physical reach of the coupling device. The invention may also be used to remotely connect or disconnect other umbilical leads, such as electrical lines.

Another object of the invention is to provide a means for protecting the coupling device from dust, dirt, and other debris or contaminants in the work environment. This protection is automatically provided during the coupling process and while the coupler is engaged.

Another object of the invention is a connector that can be installed with a separate standard coupler device. This allows a coupling mechanims to be conveniently installed and replaced with a minimum of expense.

Another object of the invention is to provide a connector that may be securely installed on machinery and used with a hitch. Further, the connector provides a means for fixing the distance between the halves of a standard coupler when the connector is used with a hitch.

Another object of the invention is to provide a means for minimizing the possibility of seal blowout. This is accomplished by proper fluid pressure control and alignment of the coupler and connector.

Another object of the invention is to provide a means for maintaining seals within the connector. This may be accomplished by disassembly of the connector.

Another object of the invention is to maintain proper alignment of the coupler havles during connection and during use while coupled. This is accomplished by placing each coupler half in a housing, which is itself alinged.

Another object of the invention is to provide additional locking for the coupler when engaged. This is accomplished by fluid pressure on internal portions of the invention's housings.

Another object of the invention is to dampen shock to the coupler during connection and prevent distortion of coupler components.

Another object of the invention is to have a control fluid for operating the connector separate from the primary fluid that may be communicated through the umbilical leads being coupled.

DESCRIPTION OF THE PREFERRED EMBODIMENT

Figure 1:
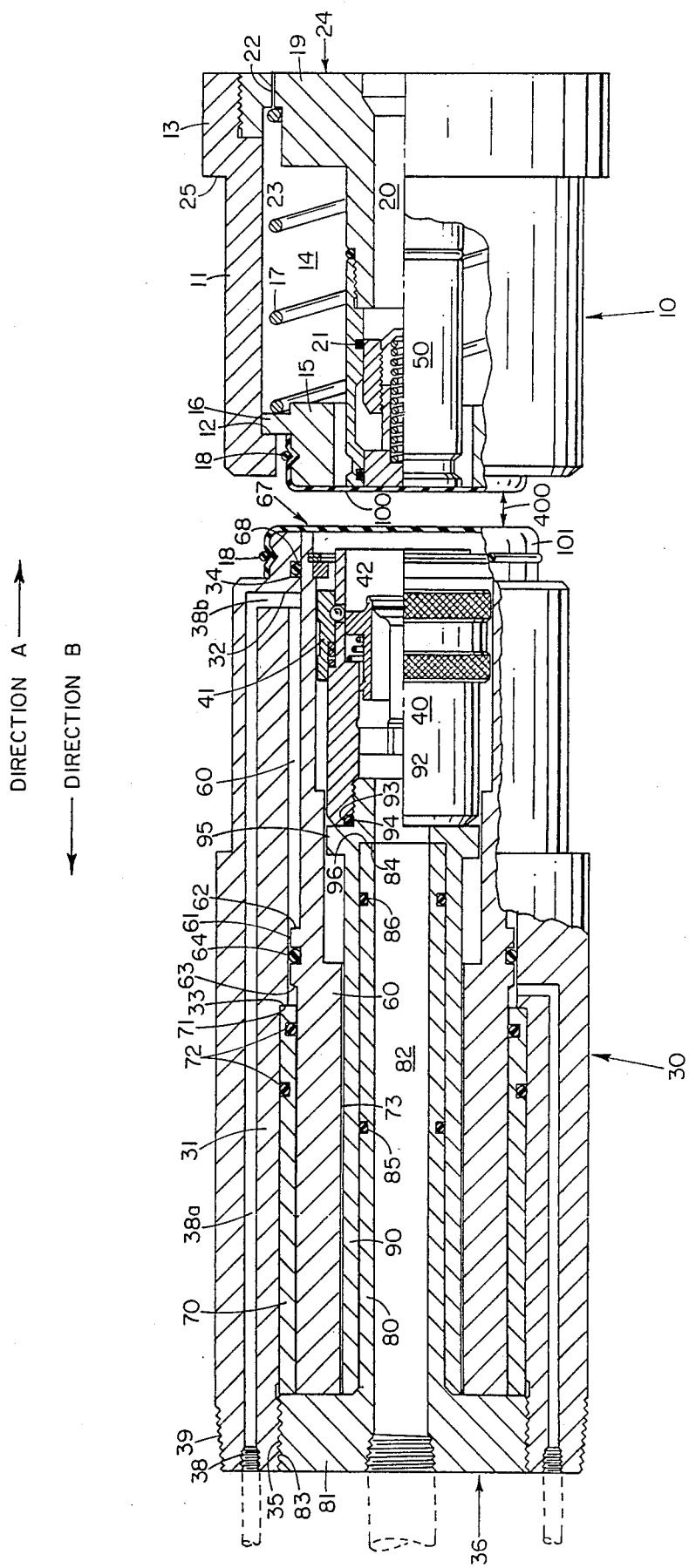
FIGS. 1A and 1B are quarter section view, showing the male and female portions of the invention in a disconnected position, and showing a standard coulping device internally mounted therein.

Referring to the drawings, the invention generally consists of a male unit 10 and a female unit 30. The forward end of the male unit 10 houses a male coupler half 50 of a standard coupling device. The forward end of the female unit 30 houses the female coupler half 40 of the standard coupling device. The external sufraces of male unit 10 and female unit 30 are generally cylindrical in shape.

FIGS. 1A and 1B show the invention in a disconnected position. FIG. 1A shows the female unit 30 and FIG. 1B shows the male unit 10.

As shown in FIG. 1B, the male unit 10 has a male housing 11, which is generally in the shape of a hollow cylinder. At the forward end of male housing 11, its internal diameter is slightly smaller, creating shoulder 12. At the rear end of male housing 11, its diameter is slightly larger, creating flange 13. Flange 13 permits male housing 11 to be mounted on the tool to be operated, such as a hammer or compactor (not shown), such that the male unit 10 extends outwardly therefrom. The internal surface of the flange 13 is threaded.

Within male housing 11 is annular chamber 14. At the forward end of chamber 14 is slider 15. Slider 15 is generally ring shaped, except for a protruding rim 16 on its external surface. Slider 15 is moveable between the forward end and rear end of chamber 14. In the disconnected position of the invention shown in FIG. 1B, spring 17 exerts pressure on slider 15, causing rim 16 to rest against shoulder 12 on the inner surface of male hosuing 11.

Affixed to the outer surface of slider 15, is a flexible protective boot 100. Boot 100 is affixed to slider 15 with a circular spring ring 18. The front face of boot 100 is shown in further detail in FIG. 4 and is further described below.

At the rear end of male housing 11 is noise piece end cap 19. The external surface of end cap 19 has three graduated diameters, with the largest diameter at its rear end and the smallest diameter at its forward end. A bore extends through the entire axial length of end cap 19, creating passageway 20. Passageway 20 is aligned with the internal passageway of the male coupler half 50, thereby allowing pressure supplying fluid to flow through the male unit 10 and male coupler half 50.

At the rear end of end cap 19, which is the end having the largest diameter, end cap 19 is externally threaded. This permits end cap 19 to be threaded onto the internally threaded surface of flange 13 on male housing 11. At the forward end of end cap 19, which is the end having the smallest diameter, end cap 19 is also externally threaded. This permits the male coupler half 50 to be threaded onto the forward end of end cap 19. O-ring 21 provides a fluid tight seal.

A small bore 22 in end cap 19 vents air from chamber 14. This ensures that movement of slider 15 and spring 17 is not impaired. A notch 23 in end cap 19 provides a groove to facilitate placement of spring 17.

The rear face 24 of end cap 19 provides for a standard connection known as a split flange (not shown). The split flange halves bolt onto the rear face 24, through step surface 25. A split flange O-ring is positioned thereon to provide a seal. This permits a fluid tight attachment of the invention to the terminal end of a fluid pressure line. Other types of standard connections are possible. A rubber pad (not shown) or other displaceable material is placed between rear face 24 and the surface on which the male unit is mounted.

As shown in FIG. 1A, the female unit 30 generally consists of five concentric shells. The outer shell of female unit 30 is outer body housing 31, which is generally in the shape of a hollow cylinder. The inner surface of body housing 31 has three diameters, each diameter being successively larger from front to rear. The decrease in the inner diameter of the forward end creates shoulder 32. The decrease in the inner diameter of the middle portion creates shoulder 33.

At the front end of body housing 31 is affixed a second flexible protective boot 101. The front face of protective boot 101 is shown in further detail in FIG. 4 and is more fully described below. Boot 101 is affixed to body housing 31 by means of a circular spring ring 18. The internal surface of the front end of body housing 31 has a groove 34 to permit insertion of O-ring 68.

The hollow cylindrical inner surface of body housing 31 permits insertion of the other components of female unit 30 and permits flow of the primary pressure supply fluid into and out of the female unit 30. At its rear end, body housing 31 has an internally threaded surface 35.

The rear end surface 36 of body housing 31 has two ports, a first port 37 used for connection and second port 38 used for disconnection. First port 37 extends as a bore 37a approximately one half the axial length of body housing 31. Bore 37a terminates as passageway 37b. Second port 38 extends as a bore 38a almost the full axial length of body housing 31. Bore 38a terminates into passageway 38b.

In the preferred embodiment, body housing 31 has an externally threaded surface 39 at its rear end. This threaded surface 39 permits the female unit 30 to be securely and rigidly affixed to the machinery to be coupled. The threaded surface 39 is sufficient size to adjust the distance that the female unit extends from the surface upon which it is mounted. In this manner, the distance 400 between the male 10 and female unit 30, when the invention is mounted for use in conjunction with a hitch or similar interface, can be predetermined. Alternatively, body housing 31 may be bolted to the surface on which female unit 30 is mounted, by means of bolts extending through a flange (not shown) at the rear end of body housing 31.

There are four additional components inside body housing 31, which are each generally in the shape of a hollow cylinder or tube. They are: shifter 60, stop tube 70, port tube 80, and flow tube 90. Shifter 60 and flow tube 90 are slidably movable along the axial length of female housing 30. Stop tube 70 and port tube 80 are stationary.

Shifter 60 is concentric to the internal surface of the body housing 31 and inserted therein. The external surface of shifter 60 is generally slightly smaller than the internal circumference of body housing 31. At a predetermined point, approximately one half the axial length of shifter 60, its outer surface has a protruding rim 61. This rim has a front shoulder 62 and a rear shoulder 63. Rim 61 is grooved to provide for a seal 64 between the outer surface of shifter 60 and the inner surface of body housing 31. The space between the forward end of shifter 60, in front of rim 61 and body housing 31, defines annular chamber 69.

Shifter 60 has three different internal diameters. At the forward end of shifter 60, the internal diameter is largest, being sufficiently large to clear the widest circumference of female coupler half 40. It should be understood that in this embodiment of the invention, the female coupler half 40 is equipped with a collar 41, which is slidably moveable back and forth along the external surface of female coupler half 40. A disconnection ring 65 is attached to the inner surface at the front end of shifter 60 by means of retaining ring 66. The front face of shifter 60 defines leading surface 67.

Stop tube 70 is concentrically inserted between the inner surface of the body housing 31 and the outer surface of shifter 60. The space between stop tube 70 and the rear portion of shifter 60, behind rim 61, defines annular chamber 73. The forward face of stop tube 70 defines a surface 71. The inner surface of stop tube 70 is smooth and provides a part of the sliding surface for shifter 60. Stop tube 70 is separately machined and inserted in the space between body housing 31 and shifter 60, eliminating difficult machining and asembling operations caused by rim 61 on the shifter 60.

Stop tube 70 is provided with notches 72, so that standard seals can be placed at predetermined points between the inner surface of body housing 31 and the outer surface of the stop tube 70 and between the inner surface of stop tube 70 and the outer surface of shifter 60. Stop tube 70 is prevented from moving forward along the axial length of the inner surface of body housing 31 by shoulder 33 of body housing 31.

Port tube 80 is the innermost component of female unit 30. Port tube 80 is generally in the shape of a cylindrical shell, but has a flange 81 at its rear end. Flange 81 of port tube 80 has an externally threaded surface 83. This permits attachment of the flow tube 40 to the internally threaded surface 35 of body housing 31. Accordingly, port tube 80 is stationary within female unit 30, and prevents stop tube 70 from moving rearward along the axial length of body housing 31.

The hollow inner surface of port tube 80 creates passageway 82, which is aligned with the passageway in the female coupler half 40, thereby permitting pressure-supplying fluid to flow through the female unit 30 and the female coupler half 40. The rear end of passageway 82 is threaded to accept a standard adapter, which then connects to a fluid hose. The front face of port tube 80 defines surface 84.

Flow tube 90 is located inside female unit 30 between port tube 80 and shifter 60. Flow tube 90 is generally in the shape of a cylindrical shell, except at its forward end 91. The forward end 91 has an externally threaded outer surface 92 to permit attachment to the inwardly threaded rear end of female coupler half 40. On the forward end of flow tube 90, immediately behind the threaded surface 92, is notch 93, which permits secure placement of an O-ring 94. Behind notch 93 is rim 95, which protrudes outwardly form the external surface of flow tube 90.

The inner surface of flow tube 90 is smooth, and is of uniform diameter except at its forward end. At the forward end, the inner diameter of flow tube 90 is slightly smaller. This creates surface 96. In the disconnected position shown in FIG. 1A, surface 96 is in proximity to, but not resting against, surface 84.

Flow tube 90 is slidably movable in the direction of its axial length. This movement corresponds to the movement of the female coupler half 40.

Figure 4:
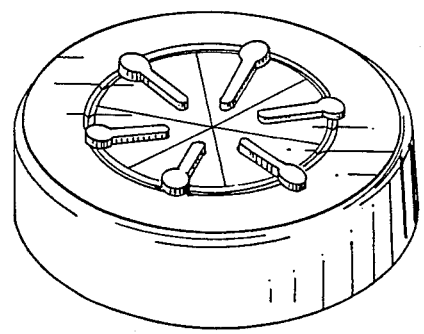
FIG. 4 is a perspective view of protective rubber boots that cover the faces of the male and female units of the invention.

FIG. 4 shows the front face of boots 100 and 101, which are not necessarily the same diameter but are similar in appearance. Boot 100 and boot 101 have radial slits 110, which permit opening of boot 100 and boot 101 during connection. Radial slits 110 are of a predetermined length, so as to permit proper opening during connection and protection of the coupler halves while connected. Ribs 11 on the front face of boots 100 and 101 encourage proper retraction during disconnection. Groove 112 encourages boots 100 and 101 to open and create a circular opening approximately the radius of radial slits 110.

The operation of the invention can be seen from the sequence of FIGS. 1A, 1B, 2 and 3. The figures illustrate the forward movement of internal portions of the invention during the process of connecting the coupling device.

Figure 2:
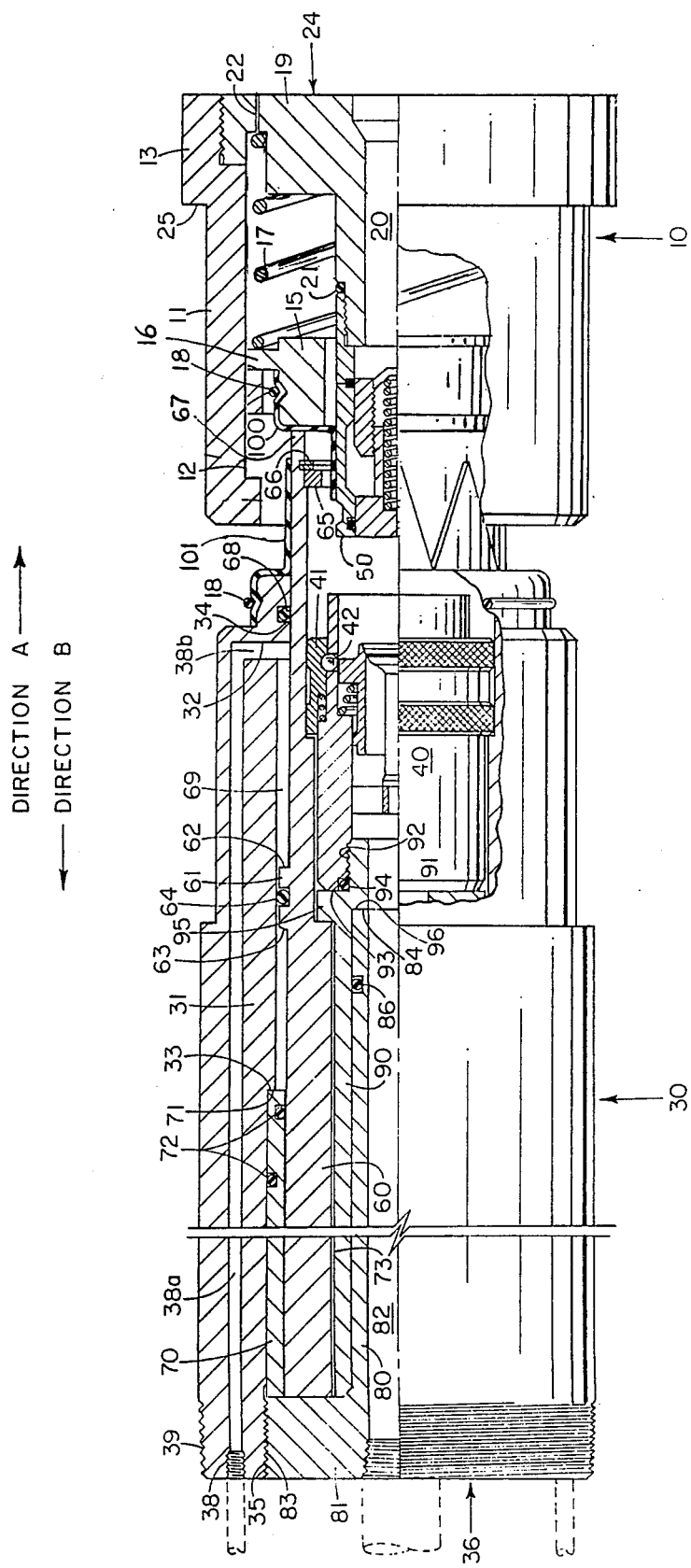
FIG. 2 is a quarter section view, showing the male and female portions of the invention in the process of connecting the internally mounted coupling device.

To being the connection process, the male unit 10 and female unit 30 are placed near each other, with their respective front faces as nearly aligned as possible. Pressurized fluid is supplied in port 37, and is transmitted through bore 37a to passageway 37b. The pressurized fluid acts against the area of surface 71 and the area of shoulder 63 on shifter 60, causing shifter 60 to advance in direction A. The leading surface 67 of the shifter 60 pushes against boot 101, causing the radial slits 110 to separate and boot 101 to open. Grooves 112 in boot 101 encourage radial slits 110 to open correctly. The open portion of boot 101 rides on the external surface of shifter 60. Shifter 60 continues to advance through boot 101, which rides on the outside surface of shifter 60, and contacts the front surface of boot 100 covering slider 15. FIG. 2 shows the invention as the leading surface 67 of shifter 60 contacts the front surface of boot 100. The movement of shifter 60 in direction A pushes slider 15 inward, against the force of spring 17 towards the rear end of chamber 14. The rearward movement of slider 15 causes the radial slits 110 of boot 100 to open. The open face of boot 100 then rides against the external surface of the male coupler half 50. Groove 112 in boot 100 encourages radial slits 110 to open correctly.

It is important in connecting the male unit 10 and female unit 30 of the invention, that boot 101 be fully open before shifter 60 contacts surface 28. Accordingly the length of radial slits 110 must not be greater than the distance shifter 60 is extended before contacting the front surface of boot 100.

As shifter 60 advances in direction A, shoulder 30 of the shifter 60 contacts and pushes against shoulder 31 of the flow tube 90. This causes flow tube 90 to move in direction A, its movement corresponding to the movement of shifter 60. Flow tube 90 continues to advance in direction A, carrying the female half 40 of the coupler, to which the forward end of flow tube 90 is attached.

Eventually, the shifter 60, flow tube 90, and female coupler half 40, are sufficiently extended from boot 101 such that the female coupler half 40 pushes against male coupler half 50. The forward movement of female coupler half 40 against the male coupler half 50 causes them to lock together. Travel in the forward direction of shifter 60, flow tube 90 and female coupler half 40 is stopped when shoulder 62 contacts shoulder 32. Action of the detent mechanism 42 of female coupler half 40 and male coupler half 50 locks the coupler.

Additional locking is provided by fluid pressure acting between surface 84 and surface 96, which holds flow tube 90 in passage 82 away from surface 84 of port tube 80. Locking is also provided by pressurized fluid entering from port 37 acting between shoulder 63 of the shifter 60 and the front surface 71 of stop tube 70.

Figure 3:
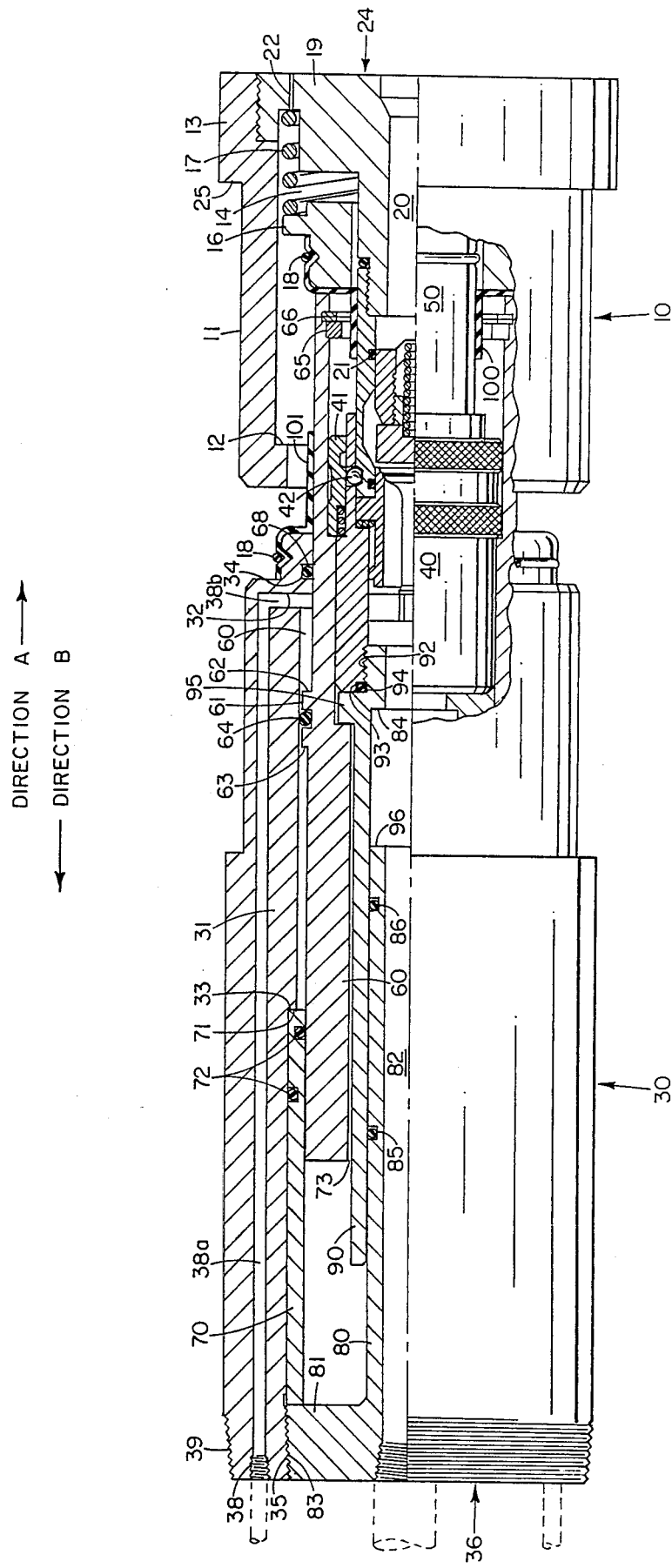
FIG. 3 shows the invention after connection of the coupling device.

As shown in FIG. 3, the invention is then in a position for fluid pressure flow. The flow will enter through passage 82 in port tube 80 and depart through passage 20 in end piece 19. O-rings 85 and 86 seal the fluid flow as it passes from passageway 82 to the female coupler half 40. O-ring 94 seals the flow of pressure fluid between female coupler half 40 and flow tube 90.

During connection, pressure and stress on seals within the invention is minimized by rubber pad (not shown) between the rear face 24 and the surface on which it is mounted. This rubber pad encourages and maintains proper alignment of the male unit 10 and the female unit 30 and the male coupler half 50 and female coupler half 40 contained therein. The pushing of female unit 30 against the male unit 10 on the rubber pad allows female unit 30 to align male unit 10.

To disconnect the male coupler half 50 and the female coupler half 40, the flow of the primary fluid through passageway 82 is discontinued. Fluid pressure is introduced through port 38. This fluid pressure is transmitted through bore 38a and passageway 38b to shoulder 62 on shifter 60. O-ring 68 provides a fluid tight seal and cooperates to direct pressure fluid from port 38 to shoulder 62. This causes shifter 60 to move in direction B. As shifter 60 moves in direction B, disconnection ring 65 contacts the collar 41 of the female coupler half 40. Collar 41 is pushed in diretion B, causing the mechanical unlocking of female coupler half 40 from male coupler half 50.

Continued flow into port 38 causes shifter 60, coupler 40 and flow tube 90 to retract inside the body housing 31. As the assembly retracts, slider 15 is relieved of the pressure from shifter 60 and the force of spring 17 cause slider 15 to move in direction B. This movement automatically closes boot 100, thereby again providing a protective covering for the male coupler half 50. As the shifter retracts, boot 101 closes over female coupler half 40. The assembly consisting of shifter 60, flow tube 90 and female coupler half 40 continues to move in direction B until in the position shown in FIGS. 1A and 1B.

The invention provides for proper venting to achieve locking and unlocking of the coupler halves 40 and 50. To achieve locking, as shifter 60 advances, fluid must be allowed to escape from the annular chamber 69 on the forward side of rim 61. Likewise, to achieve unlocking, the annular chamber 73 on the rear side of rim 61 must be vented. This is accomplished by a standard four-way control valve (not shown) that simultaneously pressurizes port 37 and vents port 38 or pressurizes port 38 and vents port 37.

It shown be understood that the fluid pressure lines for operating the invention are separate from the fluid pressure lines for operating the machinery. The controlling fluid is introduced into ports 38 and 37 to operate the invention. The primary fluid enters and exists passageways 82 and 20 to operate the machinery. The fluids could be of the same type from the same source or of different types. If the fluids are from the same source, the fluid flow for coupling and uncoupling should be introduced prior to the fluid flow for operating the machinery.

The seals described above as O-ring seals may be other types of annular seals. Exceptions are seals 94 and 21, which seal the threaded connection between female unit 30 and female coupler half 40 and male unit 10 and male coupler half 50, respectively. All seals are fluid tight seals.

It should also be understood that, when the invention is installed on machinery using a hitch or similar interface between the machinery and tool or other apparatus, the distance 400 between the front face of the male unit 10 and the front face of the female unit 30 is critical. In the preferred embodiment, this distance is predetermined at installation of the invention by means of the threaded surface 39 on the female unit 10.

It is also possible to use the invention for connecting other umbilical lines, such as electrical lines. Any standard coupler that is charcterized by a collar or other externally projecting surface for triggering the coupler locking mechanism may be used.

I claim:

1. A quick connector for a coupler having a female coupler half and male coupler half for remote operation by a pressurized fluid comprising:

male housing of sufficient depth and circumference to mount said male coupler half therein;

female housing of a generally cylindrical and hollow shape of sufficient depth and circumference to mount said female coupler half therein, said female housing having a means for transmitting said pressurized fluid through an input passage and an output passage for connection and disconnection, respectively;

port tube inside said female housing, joined to the rear end of said female housing, such that forward of said joining, an annular cylindrical space being defined between the length of said female housing and the length of said port tube, said port tube being stationary within said female housing;

shifter tube located within said annular space, said shifter tube being generally cylindrical and slidably moveable along said second end of said female housing;

disconnection ring attached to the front end of said shifter tube wherein said disconnection ring catches said female coupler half such that said female coupler half may be unlocked from said male coupler half during decoupling;

flow tube having said female coupler half mounted on a forward end thereof, said flow tube being generally cylindrical and slidably moveable between said shifter tube and said port tube;

said pressurized fluid being first applied through said input passage to a connecting pressure surface of said shifter tube to move said shifter tube and said female coupler half along with said flow tube toward said male coupler half for coupling therewith, such that said shifter tube, said flow tube, and said female coupler half are extended from said female housing;

said pressurized fluid being removed from said input passage and second applied through said output passage to a disconnecting pressure surface of said shifter tube to move said shifter tube and female coupler half along with said flow tube away from said male coupler half for decoupling therefrom, such that said shifter tube, said flow tube, and said female coupler half are retracted into said housing.

2. The quick connector as recited in claim 1 wherein protective boots cover the front face of said female housing and of said male housing, said boots having means for opening and closing, said boot over said female housing opening outwardly from said female housing.

3. The quick connector as recited in claim 2 wherein a slider tube in said male housing causes opening and closing of said boot on said male housing.

4. The quick connector as recited in claim 3 wherein said shifter tube has a leading surface for contacting and moving said slider tube.

5. The quick connector as recited in claim 1 wherein said female housing comprises an outer shell and a stop tube positioned above the rear end of said shifter tube.

6. The claim as recited in claim 1 wherein the innermost portion of said male housing and of said port tube in said female housing define a pressurized passage to permit the flow of pressurized fluid into and out of said male coupler half and said female coupler half.

7. The claim as recited in claim 1 wherein said connecting pressure surface of said shifter means and said disconnecting pressure surface of said shifter means is formed by a rim on the external surface of said shifter means.

8. A method for remotely operating a quick connector for a coupler having a female coupler half and a male coupler half by pressurized fluid, comprising the steps of:

placing said male coupler half inside a male housing and attaching them together;

attaching a terminal end of an umbilical lead to a port at the rear end of said male housing;

placing said female coupler half in the forward end of a female housing that is of generally cylindrical and hollow shape and having a means for transmitting said pressurized fluid through an input passage and an output passage, for connection and disconnection, respectively;

attaching a terminal end of an umbilical lead to a port at the rear end of said female housing;

inserting a port tube inside said female housing, being secured to a first end of said female housing, and defining a space between a second end of said female housing and said port tube;

inserting a shifter tube inside said female housing, said shifter tube being generally cylindrical slidably movable along said second end of said female housing;

inserting a flow tube inside said female housing, said flow tube being affixed to said female half, and said flow tube being generally cylindrical and slidably movable between said shifter tube and said port tube;

placing the front face of said female housing near the front face of said male housing;

advancing, for purposes of connection, by means of said pressurized fluid, said shifter tube from a position within said female housing to a position such that the front face of said female coupler half contacts the front face of said male coupler half such that further pressure applied to said female coupler half and said male coupler half causes said male coupler half and said female coupler half to lock together;

retracting, for purpose of disconnection, by means of said pressurized fluid, said shifter tube;

catching said female coupler half, by means of a projecting surface on the inner surface of said shifter tube, thereby unlocking the female coupler half from the male coupler half and carrying the female coupler half inside said female housing.

9. The method recited in claim 8, further comprising the step of attaching protective boots over the faces of said male housing and said female housing, said boots having means for opening and closing.

10. The method as recited in claim 9, further comprising the step of pushing said shifter tube against a slider tube to which said protective boot over said male half is attached, such that said protective boot opens and rides on the external surface of said male coupler half.

11. The method as recited in claim 9 further comprising the step of sealing said place of attachment of said flow tube to said female housing and said place of attachment of said male housing and said male coupler half, so that pressurized fluid flows into and out of said male half and said female half through fluid tight passageways.

* * * * *